(12) United States Patent
Salsich et al.

(10) Patent No.: US 10,328,516 B2
(45) Date of Patent: *Jun. 25, 2019

(54) METHOD AND APPARATUS FOR AUTOMATICALLY CONTROLLING GAS PRESSURE FOR A PLASMA CUTTER

(71) Applicant: ILLINOIS TOOL WORKS INC., Glenview, IL (US)

(72) Inventors: Anthony V. Salsich, Appleton, WI (US); Joseph C. Schneider, Menasha, WI (US); James F. Ulrich, Appleton, WI (US)

(73) Assignee: Illinois Tool Works Inc., Glenview, IL (US)

(*) Notice: Subject to any disclaimer, the term of this patent is extended or adjusted under 35 U.S.C. 154(b) by 1106 days.

This patent is subject to a terminal disclaimer.

(21) Appl. No.: 14/204,913

(22) Filed: Mar. 11, 2014

(65) Prior Publication Data

US 2014/0190944 A1    Jul. 10, 2014

Related U.S. Application Data

(63) Continuation of application No. 11/460,446, filed on Jul. 27, 2006, now Pat. No. 8,710,396.

(51) Int. Cl.
*B23K 9/00* (2006.01)
*B23K 10/00* (2006.01)
*H05H 1/36* (2006.01)
*H05H 1/34* (2006.01)

(52) U.S. Cl.
CPC ............. *B23K 10/006* (2013.01); *H05H 1/34* (2013.01); *H05H 1/36* (2013.01)

(58) Field of Classification Search
CPC .... B23K 10/006; B23K 26/14; B23K 26/703; B23K 26/164; H05H 1/34; H05H 1/36; H05H 1/3405; H05H 1/341
USPC ............ 219/121.44, 121.48, 121.39, 121.33, 219/121.84, 121.55
See application file for complete search history.

(56) References Cited

U.S. PATENT DOCUMENTS

| | | | |
|---|---|---|---|
| 4,133,988 A | 1/1979 | Esibyan | |
| 4,175,225 A | 11/1979 | Holko | |
| 5,170,033 A | 12/1992 | Couch, Jr. | |
| 5,424,507 A | 6/1995 | Yamaguchi | |
| 5,811,757 A * | 9/1998 | Higgins | H05H 1/36 219/130.32 |
| 6,420,672 B1 | 7/2002 | Ulrich | |
| 6,614,670 B1 * | 9/2003 | Geissler | H02M 1/08 363/21.12 |

(Continued)

FOREIGN PATENT DOCUMENTS

DE    19536150    4/1997
EP    1655095    5/2006

*Primary Examiner* — Michael G Hoang
(74) *Attorney, Agent, or Firm* — McAndrews, Held & Malloy, Ltd.

(57) ABSTRACT

A system for providing a dynamically controlled plasma cutting system. The plasma cutting system includes a proportional valve and a sensing device arrangement and a controller connected to this arrangement. The system is configured to dynamically control gas flow in a plasma torch. The system measures gas pressure at a proportional valve and makes necessary gas pressure adjustments in the system by way of controlling a drive signal sent to the proportional valve to control gas flow.

15 Claims, 5 Drawing Sheets

(56) References Cited

U.S. PATENT DOCUMENTS

| | | |
|---|---|---|
| 6,622,058 B1 | 9/2003 | Picard |
| 6,627,874 B1 | 9/2003 | Yefchak |
| 6,689,983 B2 | 2/2004 | Horner-Richardson |
| 6,772,040 B1 | 8/2004 | Picard |
| 6,960,737 B2 | 11/2005 | Tatham |
| 6,977,358 B2 * | 12/2005 | Albrecht ................ B23K 9/173 219/130.1 |
| 8,710,396 B2 * | 4/2014 | Salsich ................ B23K 10/006 219/121.48 |
| 2004/0069752 A1 | 4/2004 | Ulrich |
| 2004/0226921 A1 * | 11/2004 | Picard ..................... H05H 1/36 219/121.55 |
| 2006/0163216 A1 | 7/2006 | Brandt |
| 2006/0163220 A1 | 7/2006 | Brandt |

\* cited by examiner

METHOD AND APPARATUS FOR AUTOMATICALLY CONTROLLING GAS PRESSURE FOR A PLASMA CUTTER

CROSS-REFERENCE TO RELATED APPLICATION

This application is a continuation of U.S. patent application Ser. No. 11/460,446, filed Jul. 27, 2006, entitled "Method and Apparatus for Automatically Controlling Gas Pressure for a Plasma Cutter" in the name of Anthony V. Salsich et al., which is incorporated herein by reference.

BACKGROUND OF THE INVENTION

The present invention relates generally to plasma cutting systems and, more particularly, to a method and apparatus for automatically controlling gas pressure for a plasma cutter.

Plasma cutting is a process in which an electric arc and plasma gas are used to cut or gouge a workpiece. Plasma cutters typically include a power source, a gas supply, such as compressed air, and a torch. The torch is constructed to create and maintain the plasma arc. To generate the plasma cutting power, a power source receives an input voltage from a transmission power receptacle or generator and provides output power to a pair of output terminals. One of the output terminals is connected to an electrode and the other is connected to the workpiece. An air supply is used with most plasma cutters to carry and propel the arc to the workpiece and assist in cooling the torch.

In order to operate properly, the plasma torch requires consistent, and preferably controllable air flow. Typically, this is provided by a system consisting of a pressure regulator; a downstream pressure gauge; a downstream, solenoid operated gas valve; and a downstream pressure limit switch. Using such a configuration, the operator is able to start and stop the gas flow as necessary, as well as access and adjust gas pressure settings to configure the plasma cutting system for a different cutting operation. While control of air pressure settings in this manner provides an operator with a great deal of control, such a construction is not without its drawbacks.

One drawback associated with existing gas pressure regulation systems, such as the one described above, is the imprecision associated with the use of mechanical regulators. An operator is required to manually check gas pressure and make adjustments by means of the pressure gauge and pressure regulator. Therefore, it would be preferable if a system were available that could dynamically control pressure regulation by an electronic means. Use of a control loop to control gas pressure, for example, could result in a more precisely tuned system and also allow for better accuracy and control of gas pressure. Such a system would also permit a faster transient response, or even allow for the gas pressure to be continuously altered, if need be.

Another drawback of existing systems is the inefficiency associated with the operator's need to adjust gas pressure settings. In a dynamic work environment, an operator may be required to perform gouging and cutting operations in a relatively continuous or alternating manner. The operator may be required to sequentially mix a plurality of cutting processes and a plurality of gouging processes. Suspending one process in order for the operator to check a pressure gauge and adjust the pressure setting for another operation is time consuming and results in overall process inefficiency. Therefore, it would be preferable if a system were available that would allow multiple pressure levels to be automatically and repeatedly set by means of multiple, selectable electrical switch positions, thus obviating the need for the user to make pressure adjustments.

It would, therefore, be desirable to design a plasma cutting system with simplified construction, operation, and control to ensure optimal pressure in the plasma torch and maximize efficiency and longevity in the plasma cutting system.

BRIEF DESCRIPTION OF THE INVENTION

The present invention provides a dynamically controlled plasma cutting system that overcomes the aforementioned drawbacks. The plasma cutting system includes a proportional valve and pressure sensor arrangement and a controller connected to this arrangement. The proportional valve and pressure sensor are configured to dynamically control gas flow in a plasma torch and the controller is configured to adjust the drive signal sent to the proportional valve.

Therefore, in accordance with one aspect of the present invention, a plasma cutting system is disclosed. The plasma cutting system includes a housing, a power source disposed within the housing, a plasma torch, and a gas flow system. The system also includes a proportional valve with an adjustable orifice to control gas flow, a sensing device, and a controller configured to receive a signal from the sensing device and regulate operation of the proportional valve.

According to another aspect of the present invention, a plasma cutting system is disclosed. The plasma cutting system includes a plasma torch, a gas flow system constructed to receive pressurized gas, a proportional valve having a control to regulate gas flow, a sensing device, and a controller configured to receive a reading from the sensing device and regulate operation of the proportional valve control.

According to a further aspect of the invention, a method of controlling gas pressure in a plasma cutting system is disclosed. The method includes the steps of selecting a desired cutting operation to be performed, determining a desired gas pressure set point for the cutting operation, detecting one of an output gas pressure and an input gas pressure upon initiation of the cutting operation, determining a drive signal necessary to achieve the desired gas pressure in response to the detected one of the output gas pressure and input gas pressure, and adjusting gas pressure in the plasma cutting system based on the drive signal in order to bring the actual output gas pressure or input gas pressure toward the gas pressure set point.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
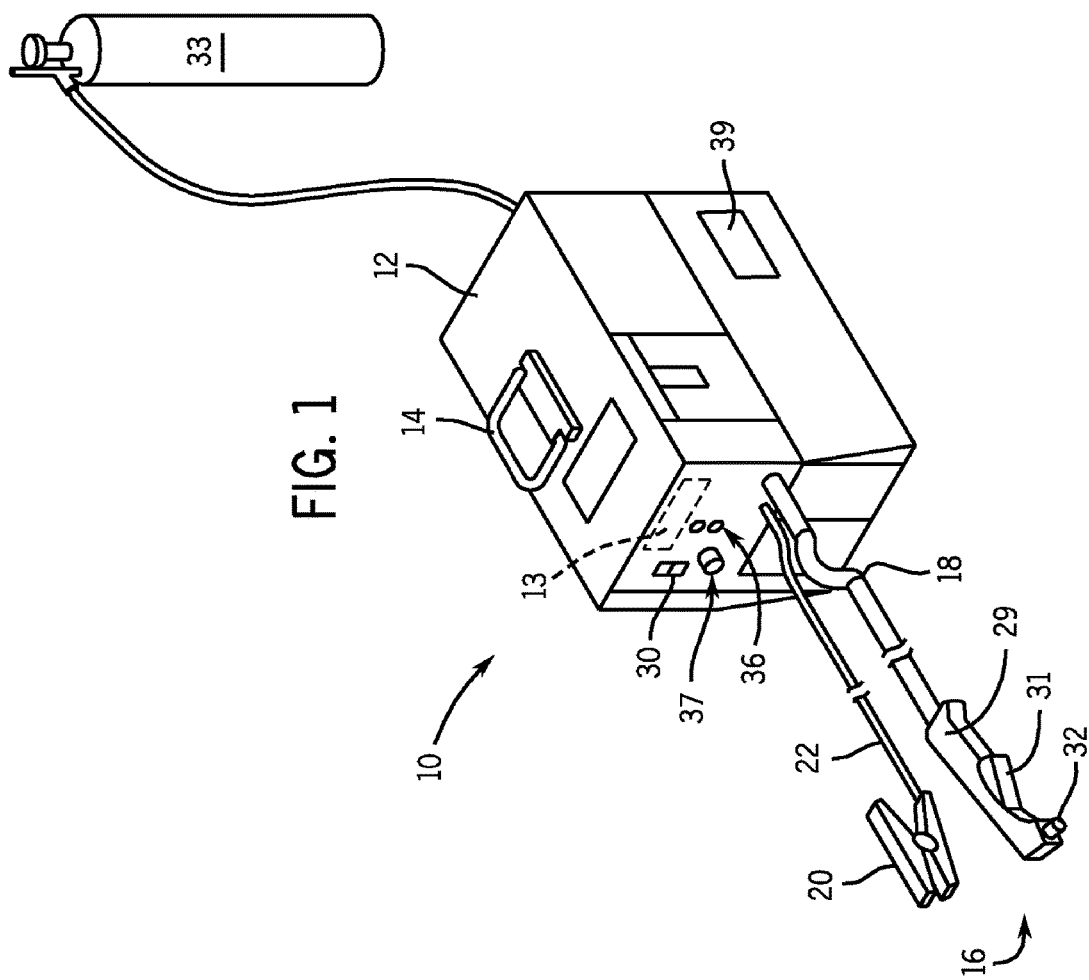
FIG. 1 is a perspective view of a plasma cutting system according to the present invention.

FIG. 1 shows a plasma cutting system 10 according to the present invention. Plasma cutting system 10 is a high voltage system with open circuit output voltages that typically range from approximately 230 Volts Direct Current (VDC) to over 300 VDC. Plasma cutting system 10 includes a power source 12 to condition raw power and generate a power signal suitable for plasma cutting applications. Power source 12 includes a controller 13 that receives operational feedback and monitors the operation of a plasma cutting system 10. Power source 12 includes a handle 14 to effectuate transportation from one site to another. Connected to power source 12 is a torch 16 via a cable 18. Cable 18 provides torch 16 with power and compressed air or gas, and also serves as a communications link between torch 16 and power source 12. Torch 16 includes a handle portion 29, or torch body, having a trigger 31 thereon and work tip 32 extending therefrom. Although shown as attached to torch 16, it is understood and within the scope of the claims that trigger 31 could be connected to power source 12 or otherwise remotely positioned relative to actuating torch 16.

Also connected to power source 12 is a work clamp 20, which is designed to connect to a workpiece (not shown) to be cut and provide a grounding or return path. Connecting work clamp 20 to power source 12 is a cable 22 designed to provide the return path, or grounding path, for the cutting current from torch 16 through the workpiece and work clamp 20. Power source 12 includes a plurality of inputs such as an ON/OFF switch 30 and may also include amperage controls and indicator lights 36. Power source 12 can include an operating mode selector 37 connected to controller 13, which allows an operator to select a desired mode of operation of the plasma cutting system 10. That is, an operator can manually configure the plasma cutting system 10 to operate in a cutting or gouging mode if the system is so equipped.

To effectuate cutting, torch 16 is placed in close proximity to the workpiece connected to clamp 20. A user then activates trigger 31 on torch 16 to deliver electrical power and compressed air to work tip 32 of torch 16 to initiate a pilot arc and plasma jet. Shortly thereafter, a cutting arc is generated as the user moves the torch to the workpiece. The arc transfers from the electrode to the workpiece through the tip. The user may then perform the desired plasma effectuated processing of the workpiece by moving torch 16 across the workpiece. The user may adjust the speed of the cut to reduce spark spatter and provide a more-penetrating cut by adjusting amperage and/or air pressure. Gas is supplied to torch 16 from a pressurized gas source 33, from an internal air compressor 39, or an air compressor (not shown) external to power source 12.

Figure 2:
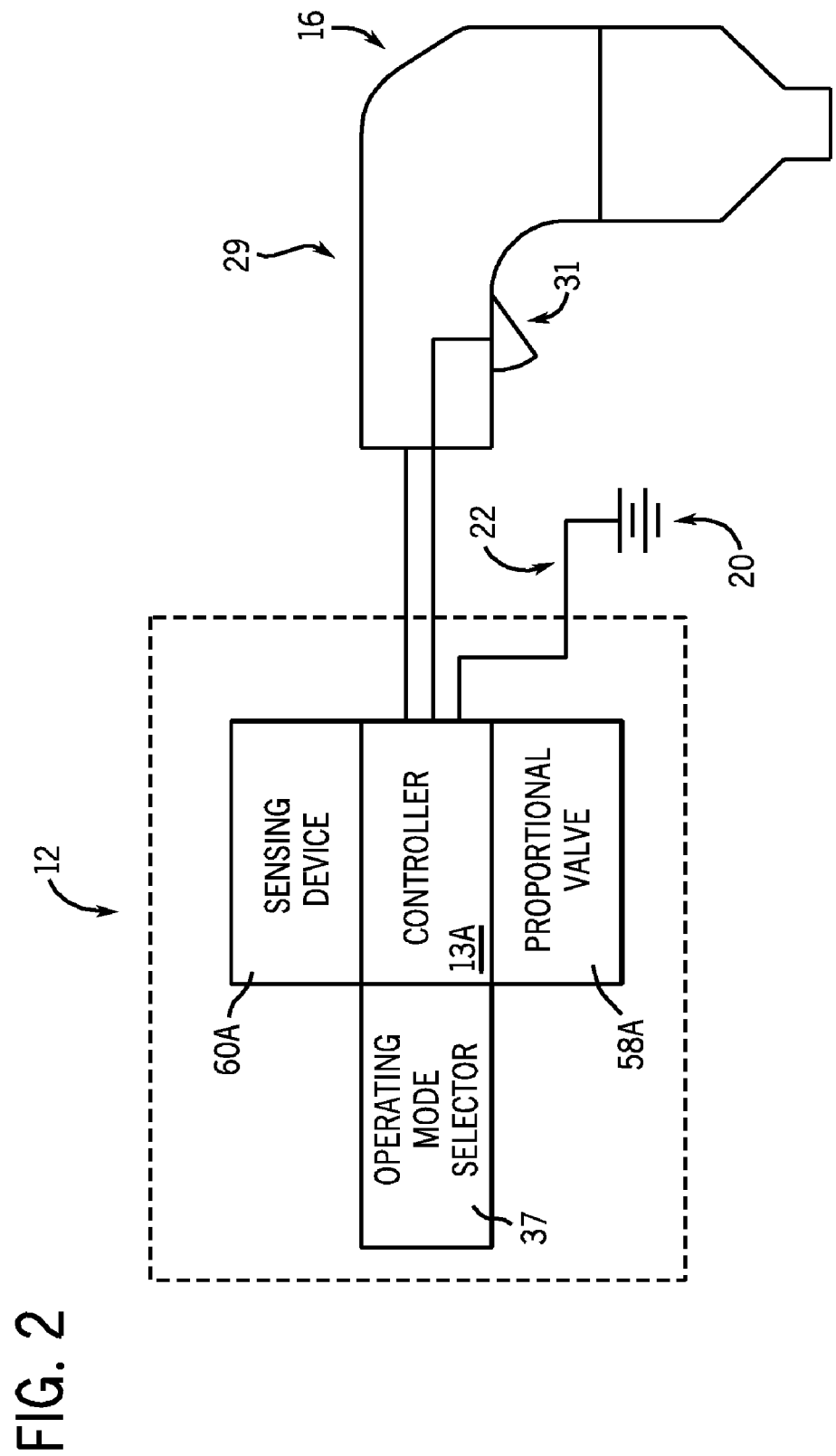
FIG. 2 is a schematic representation of the plasma cutting system shown in FIG. 1.

As shown in FIG. 2, in one embodiment, controller 13A is disposed within power source 12. Controller 13A is connected to an operating mode selector 37. Operating mode selector 37 is used to select a desired mode of operation of the plasma cutting system 10. Each mode of operation corresponds to a specific set of gas pressure and gas flow set points. The set points will exemplify ideal operating conditions for the plasma cutting system 10 for each mode of operation. Controller 13A is configured to store information regarding the gas pressure and gas flow set points for each desired mode of operation.

Controller 13A is additionally operatively connected to plasma torch 16 and trigger 31, as well as to sensing device 60A. Sensing device 60A is configured to communicate to controller 13A one of an outlet or inlet gas pressure and/or a gas flow. In one embodiment, the sensing device 60A is a pressure sensor used to measure output gas pressure. The pressure sensor can be a piezo-resistive pressure sensor or any other similar sensor capable of measuring gas pressure in a welding-type environment. A detected output gas pressure at proportional valve 58A is measured by pressure sensor 60A and communicated to controller 13A. The detected output pressure provides controller 13A with the information necessary to calculate a drive signal to be sent to proportional valve 58A, wherein the drive signal can be either of a current or a voltage. The drive signal sent to proportional valve 58A by the controller 13A thus regulates the gas pressure used in the cutting operation for the plasma cutting system 10.

Controller 13A is further configured to determine an input gas pressure in the plasma cutting system 10 as a function of output pressure and the drive signal. In one embodiment, a look-up table is used to set forth an input pressure and an output pressure associated with each of a number of cutting operations selected by way of the operating mode selector 37. Inconsistencies in the input gas pressure can then be detected by comparing an expected drive signal current or voltage to be sent to the proportional valve 58A, 58B, which is given in the look-up table for a corresponding given input and output gas pressure, to a drive signal that is actually necessary to achieve the desired output gas pressure in the plasma cutting system for the selected cutting operation. Once the trigger 31 of the plasma torch 16 is actuated, the expected drive signal and the actual necessary drive signal can be compared to determine if the actual input pressure in the plasma cutting system differs from the input pressure given in the look-up table. Controller 13A, is also configured to notify the operator that there is an out-of-spec input pressure via an indicator light 36 (shown in FIG. 1) located on face of the power supply housing 12 or through some other acceptable means.

In addition, controller 13A, is also configured to make gas pressure adjustments when the plasma cutting system 10 is set-up as having the sensing device 60A located within the power source housing 12. Controller 13A calculates a necessary gas pressure correction for a given length of torch cable 24 (shown in FIG. 1) by measuring a gas pressure fall time after the proportional valve 58A is completely closed.

Figure 3:
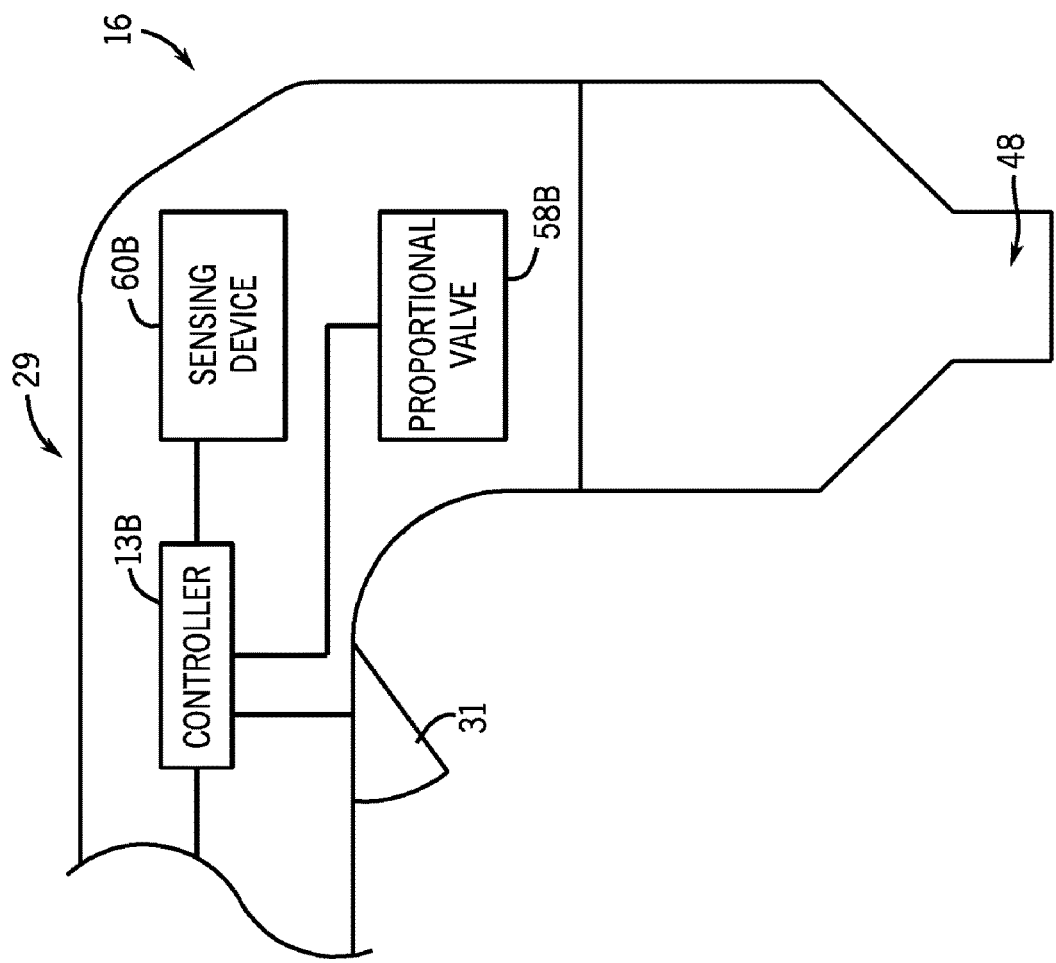
FIG. 3 is a partial schematic view of the plasma torch of the plasma cutting system shown in FIG. 1.
Figure 4:
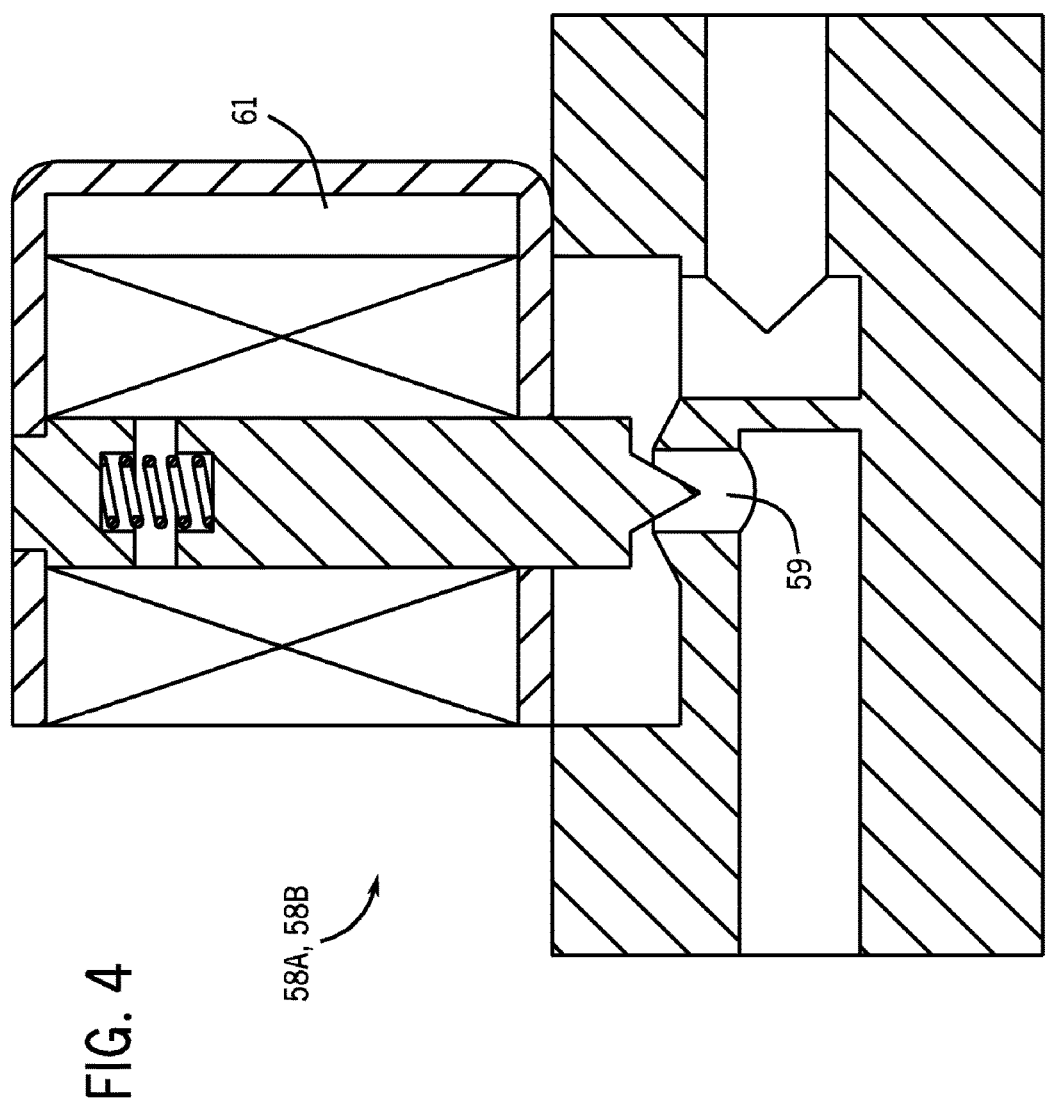
FIG. 4 is a cross sectional view of the proportional valve in the plasma cutting system of FIG. 1.

Referring now to FIG. 3, a plasma torch 16 is shown in cross section, which shows another embodiment of the current invention. As shown, plasma torch 16 houses a proportional valve 58B, controller 13B, and sensing device 60B. Proportional valve 58B is a solenoid-type valve that is connected to the controller 13B. Controller 13B, in turn, is connected to sensing device 60B. Such a construction allows the proportional valve 58B to be dynamically controlled by feedback communicated thereto from the controller 13B, in response to output or input gas pressure readings in the plasma cutting system 10 as measured by sensing device 60B. The proportional valve 58B then controls gas flow to the torch head nozzle 48. As shown in FIG. 4, the proportional valve 58A, 58B has an adjustable orifice 59 whose size is determined by the amount of electric current or voltage in the drive signal and running through control 61 in the proportional valve. Control 61 can be a coil, as shown in the embodiment of FIG. 4. As gas pressure fluctuates during a plasma cutting process, the controller 13B is able to adjust the amount of current or voltage in the drive signal sent to the control 61 in the proportional valve 58B and increase or decrease the size of the orifice 59, thus incrementally regulating the gas pressure in the plasma cutting system 10. When there is no current or voltage (i.e., no drive signal) being sent through the valve control 61, the gas flow through the orifice 59 is cut off.

Figure 5:
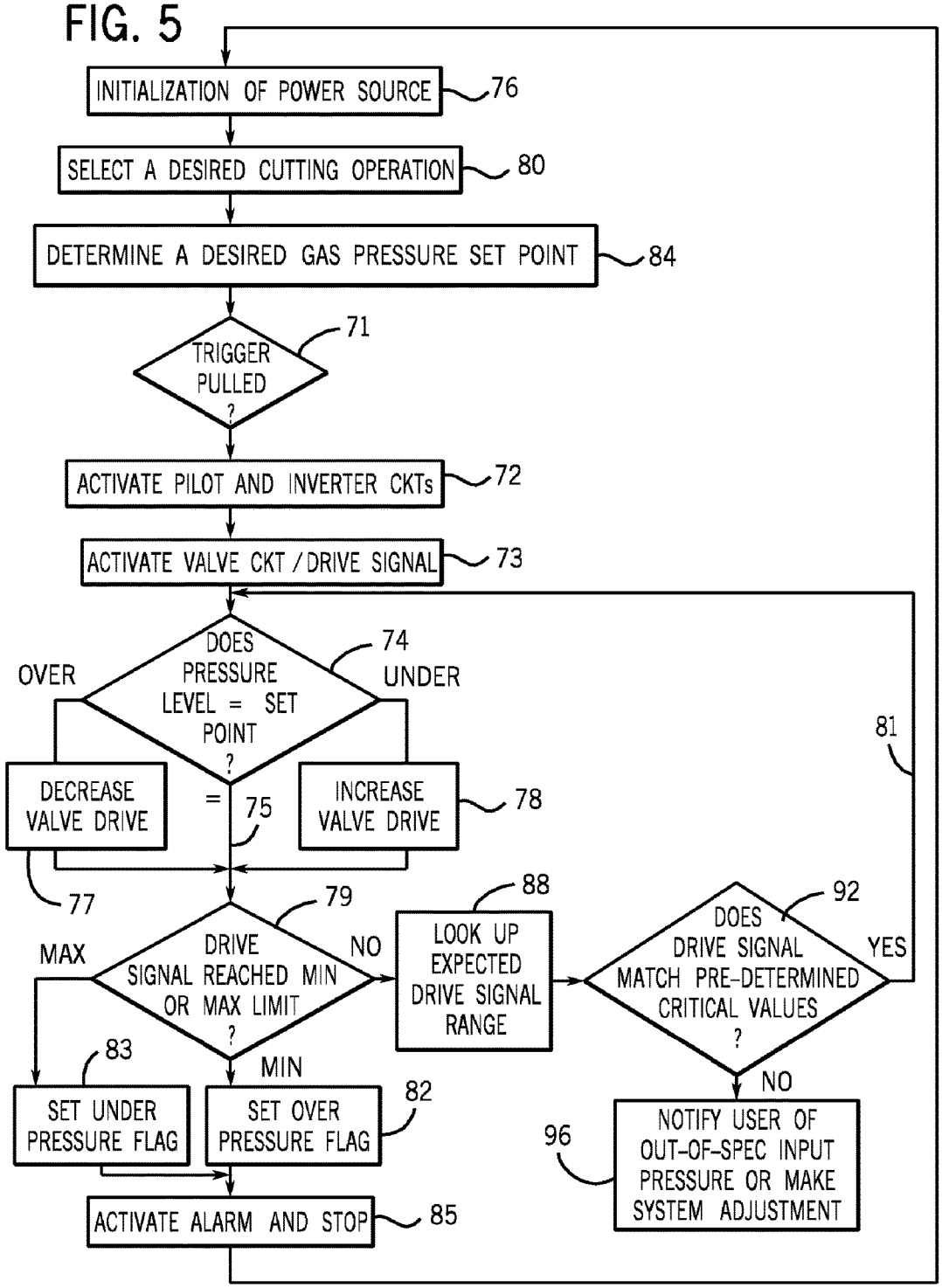
FIG. 5 is a flow chart showing a detailed description of the operation of the proportional valve and the plasma cutting system.

In FIG. 5, a more detailed description of the operation of one embodiment of the plasma cutting system and proportional valve is set forth. The process begins with operator initialization of the power source 76. Operator then selects a desired cutting operation to be performed 80 by the plasma cutting system. Upon selection of the cutting operation, the process determines a gas pressure set point 84 for the specified operation. Once the trigger of the plasma torch is pulled 71, the process is allowed to continue. Upon actuation of the trigger, a pilot arc is activated along with an inverter to power the plasma cutting system to enable an operator to begin a cutting process 72. The proportional valve is also activated by way of a drive signal so as to begin regulation of the gas flow in the plasma cutting system 73. The output gas pressure level at the proportional valve is then measured to determine whether the pressure level matches with the desired gas pressure set point associated with the cutting operation being performed 74. If the gas pressure in the valve corresponds to the desired gas pressure, no adjustments to the gas pressure level are made at that time and the drive signal to the valve remains the same 75. If the pressure level is greater than that desired, the drive signal sent to a control in the proportional valve will be decreased so as to decrease valve drive and thereby reduce the output gas pressure down to the desired level 77. If the pressure level at the proportional valve is less than the desired pressure, the drive signal sent to a control in the proportional valve will be increased so as to increase valve drive and thereby raise the output gas pressure up to the desired level 78. After any necessary adjustments to the gas pressure have been made to bring pressure to the desired gas pressure set point, the valve drive limit is monitored to determine whether a minimum or maximum valve drive limit has been reached 79. If the minimum or maximum valve drive limit has been reached, a "set over" pressure flag or "set under" pressure flag is respectively set 82, 83. Upon one of the above flags being set, an alarm is activated in the plasma cutting system to notify the operator 85. The operator is thus able to stop the cutting process if required and necessary adjustments to the plasma cutting system can be made. If the valve drive limit has not been reached, the plasma cutting system continues to operate and the cycle is repeated wherein the output gas pressure level at the proportional valve is measured to determine whether it equals the gas pressure set point and whether any additional adjustments are required to reach the desired gas pressure set point 81.

Additionally, the process set forth in FIG. 5 can determine input gas pressure as a function of output gas pressure and drive signal. After it has been determined that the drive signal has not exceeded a max or min limit 79, the actual drive signal sent to the proportional valve can be compared to an expected drive signal (associated with the selected cutting process). In one embodiment, a look-up table is used to look-up the expected drive signal range 88 associated with a given input and output gas pressure. The actual drive signal sent to the proportional valve is then compared to the expected drive signal to determine if the actual drive signal matches expected pre-determined critical values 92. Thus, by looking at the actual and expected drive signals, it can be determined if the actual input gas pressure corresponds to the predicted pressure. If the drive signal values match, no action is taken and the cycle is repeated wherein the output gas pressure level at the proportional valve is measured to determine whether it equals the gas pressure set point and whether any additional adjustments are required to reach the desired gas pressure set point 81. If the drive signal values do not match, the user is notified of an out-of-spec input pressure, or alternatively, the plasma cutting system makes the necessary adjustments 96. As an example, if the input pressure is too low, then the drive signal required to meet the desired output pressure will exceed the expected value. The user can then be notified of such error or the system can dynamically adjust itself to address the problem.

The method shown in FIG. 5 can also be modified to control gas flow in a plasma cutting system rather than gas pressure. A gas flow set point and gas flow readings would be used rather than gas pressure in such a method. Additionally, input gas pressure can be detected rather than output gas pressure.

It should be noted that the valve identified as a "proportional valve" in the above description, is not limited to a valve whose flow rate or pressure is directly proportional to voltage or current applied to its control. Rather, it is meant to imply a valve whose output changes incrementally with applied voltage or current and is not an "on-off" type valve. Voltage or current can be used to determine the valve limits, as can an auxiliary position indicator in communication with the moving part of the solenoid in the valve. There may also be other additional ways to determine valve position or the limits of its operation.

Therefore, one embodiment of the present invention includes a plasma cutting system having a housing, a power source disposed within the housing, a plasma torch, and a gas flow system. The system also includes a proportional valve to control gas flow, and a sensing device. A controller is also included in the system, which is configured to receive a signal from the sensing device and regulate a drive signal to the proportional valve.

Another embodiment of the present invention includes a plasma cutting system having a plasma torch actuated by a trigger and a gas flow system constructed to receive pressurized gas. A proportional valve having a control is used to regulate the gas flow, and a sensing device measures gas pressure or gas flow. The system also includes a controller configured to receive a signal from the sensing device and regulate a drive signal sent to the proportional valve. An adjustable operating mode selector is also included for selecting a desired cutting operation to be performed by the plasma cutting system, wherein each cutting operation has a predetermined gas flow and gas pressure set point associated with it.

A further embodiment of the present invention includes a method of controlling gas pressure in a plasma cutting system which includes the steps of selecting a desired cutting operation to be performed, determining a desired gas pressure set point for the cutting operation, detecting one of an output gas pressure and an input gas pressure upon initiation of the cutting operation, determining a drive signal necessary to achieve the desired gas pressure in response to the detected output gas pressure or input gas pressure, and adjusting gas pressure in the plasma cutting system based on the drive signal in order to bring the actual output gas pressure or input gas pressure toward the gas pressure set point.

As one skilled in the art will fully appreciate, the heretofore description of a plasma cutting system is one example of a plasma cutting system according to the present invention. The description of the present invention is merely exemplary in nature and, thus, variations that do not depart from the substance of the invention are intended to be within the scope of the invention. Such variations are not to be regarded as a departure from the spirit and scope of the appending claims.

What is claimed is:

1. A plasma cutting system comprising:
a power source configured to generate plasma cutting power;
a plasma torch coupled to the power source, wherein the plasma torch is configured for use in a manual plasma cutting operation;
a gas flow system configured to receive pressurized gas and provide a gas flow to the plasma torch;
a proportional valve configured to regulate the gas flow; and
a controller configured to:
regulate operation of the proportional valve to regulate a pressure of the gas flow by controlling a drive signal sent to the proportional valve;
compare the drive signal to an expected drive signal of a cutting process performed by the plasma cutting system; and
adjust an input gas pressure to the proportional valve based on a comparison of the drive signal to the expected drive signal.

2. The plasma cutting system of claim 1, wherein the drive signal is one of a current signal and a voltage signal.

3. The plasma cutting system of claim 1, wherein the proportional valve has an adjustable orifice to control gas flow incrementally with the drive signal.

4. The plasma cutting system of claim 3, wherein a size of the adjustable orifice is controlled by the drive signal.

5. The plasma cutting system of claim 3, wherein the gas flow through the adjustable orifice is blocked when the drive signal is terminated, and the controller alters the drive signal to achieve a desired pressure set point based on output pressure feedback from the proportional valve.

6. The plasma cutting system of claim 5, comprising a pressure sensor configured to measure the proportional valve output pressure.

7. The plasma cutting system of claim 1, comprising a flow sensor configured to measure gas flow through the proportional valve.

8. The plasma cutting system of claim 1, comprising an adjustable operating mode selector configured to provide predetermined gas pressure levels.

9. The plasma cutting system of claim 1, wherein the controller selectively initiates user notification that an input gas pressure of the plasma cutting system is not at an expected pressure level based on a comparison of the drive signal to the expected drive signal.

10. The plasma cutting system of claim 1, comprising a pressure sensor configured to measure one of input pressure and input gas flow.

11. A plasma cutting system comprising:
a plasma torch configured for use in a manual plasma cutting operation;
a gas flow system configured to receive pressurized gas;
a proportional valve having a control to regulate gas flow from the gas flow system to the plasma torch; and
a controller configured to:
regulate operation of the control of the proportional valve to regulate a pressure of the gas flow by controlling a drive signal sent to the control of the proportional valve;
detect an out-of-spec input pressure by comparing an expected drive signal for a given input pressure and output pressure to an actual drive signal for achieving a desired gas pressure set point for the manual plasma cutting operation; and
adjust an input gas pressure to the proportional valve based on a comparison of the actual drive signal to the expected drive signal.

12. The plasma cutting system of claim 11, comprising an adjustable operating mode selector coupled to the controller to enable selection of the manual plasma cutting operation from a plurality of cutting operations, wherein each cutting operation is associated with predetermined gas flow set points and predetermined gas pressure set points.

13. The plasma cutting system of claim 12, wherein the controller is configured to adjust gas flow and gas pressure to the set points by way of the drive signal sent to the proportional valve.

14. The plasma cutting system of claim 11, wherein the drive signal is one of a current signal and a voltage signal.

15. The plasma cutting system of claim 11, wherein the proportional valve contains an orifice regulated by the controller, and wherein a size of the orifice is adjusted by varying the drive signal to the control of the proportional valve.

* * * * *